Aug. 19, 1952    E. E. WHITE    2,607,536
WHEEL GUIDE
Original Filed July 3, 1948    2 SHEETS—SHEET 1
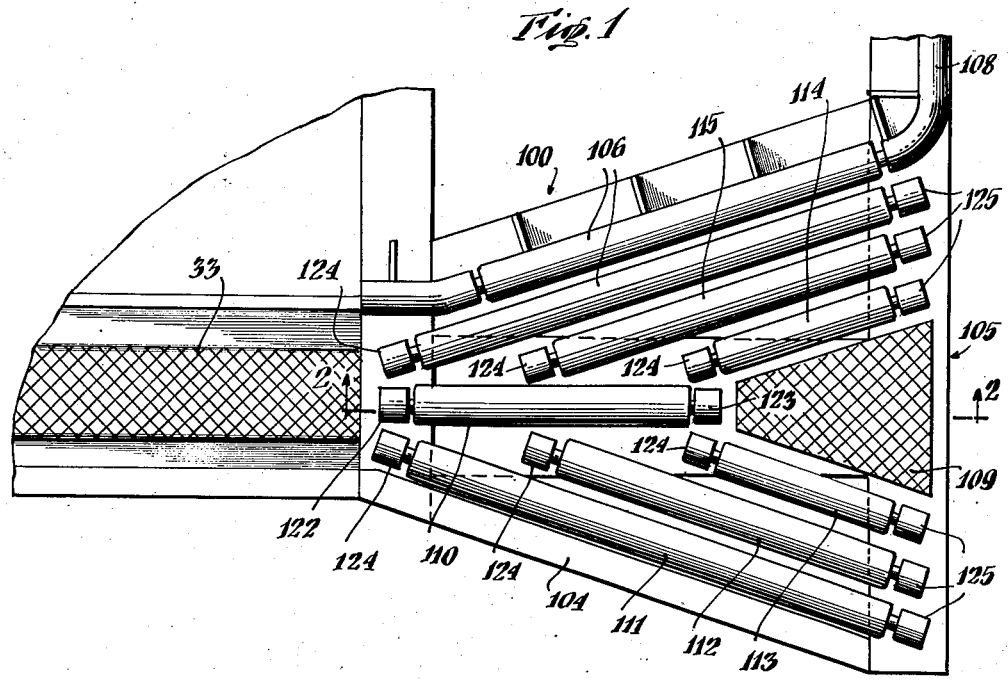
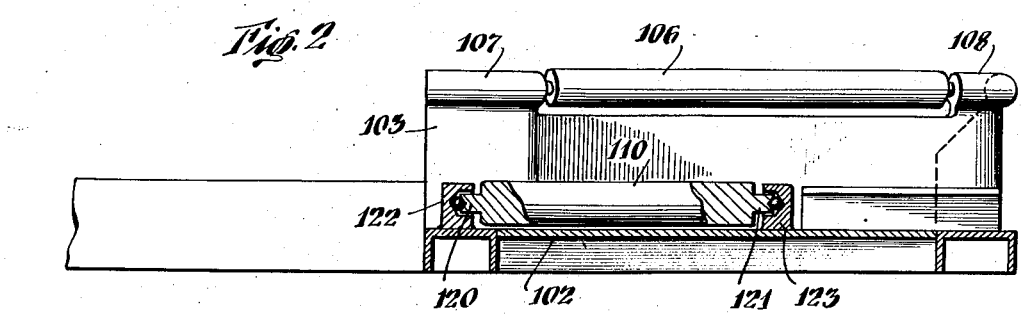
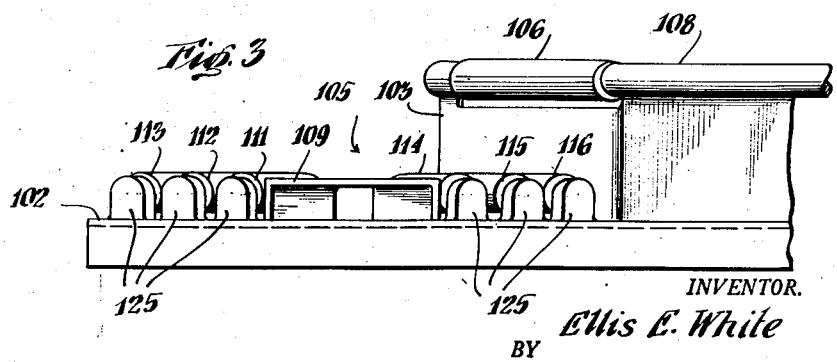
INVENTOR.
Ellis E. White
BY
Furman Rinehart
ATTORNEY

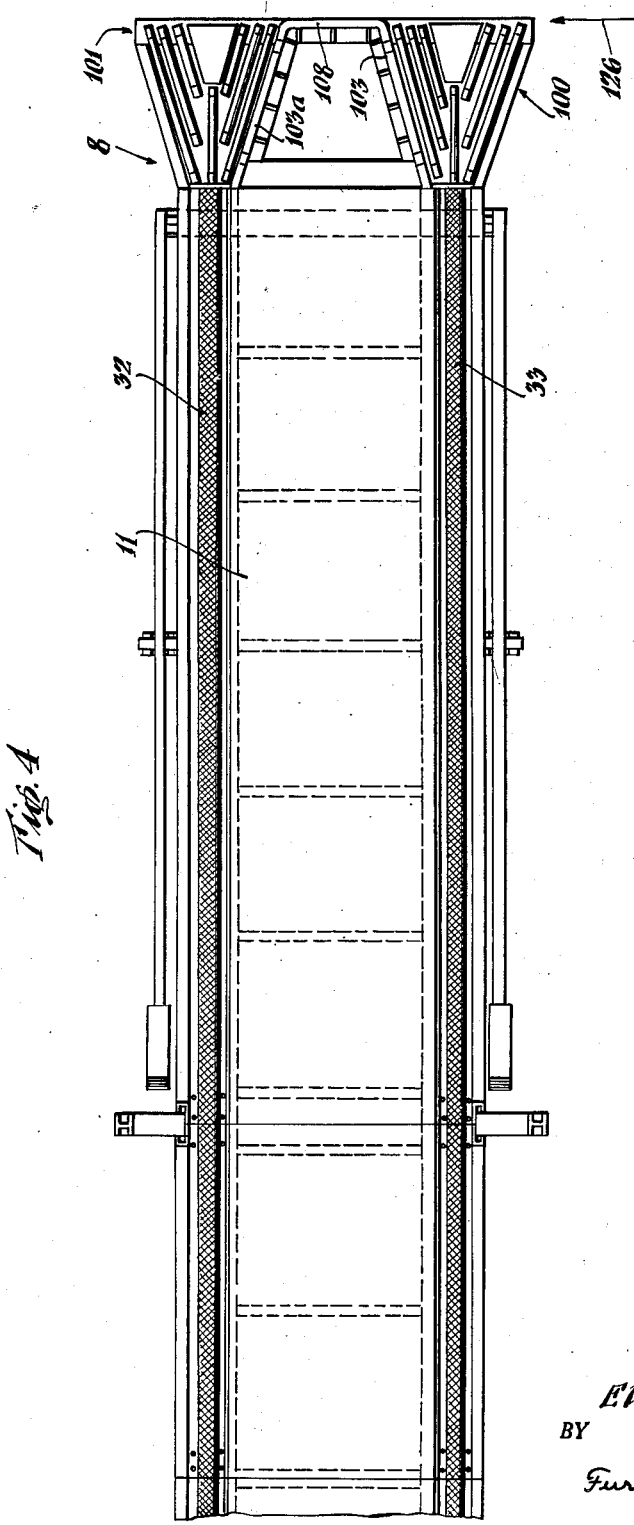

Patented Aug. 19, 1952

2,607,536

UNITED STATES PATENT OFFICE 2,607,536

WHEEL GUIDE

Ellis E. White, Beverly Hills, Calif., assignor to Multi-Deck Corporation of America, a corporation of California Original application July 3, 1948, Serial No. 38,689. Divided and this application December 21, 1949, Serial No. 134,292

6 Claims. (Cl. 238—4)

This invention relates to wheel guides for guiding the wheels of a motor vehicle driven under its own power into a parking stall or onto wheel trackways on which it is desired to move the vehicle.

This application is a division of my copending application S. N. 38,689 filed July 3, 1948. In said copending application I have disclosed a multi-deck parking structure for motor vehicles, said disclosure including the wheel guide herein described and claimed. Although the wheel guide of the invention may be advantageously utilized in the parking structure disclosed in said copending application, it may also be used in other places where a motor vehicle being driven in a given direction is to be turned on a short radius into trackways at an angle to the said given direction of travel. Speaking generally, it may, for example, be desirable to drive an automobile from a roadway or aisle onto trackways or into a parking stall at right angles to the roadway or aisle. Wheel guides embodying the invention are admirably suited for this purpose when placed at the entrance to the trackways or parking stall to provide means whereby an automobile may be turned from the roadway into the trackway or stall on a shorter radius than would otherwise be the case.

According to the invention a wheel guide is provided for directing the wheels of a motor vehicle into the trackway, by reducing lateral friction of wheel alignment with the trackway while maintaining forward traction, and it comprises a bed plate on which is mounted a set of rollers on each side of a traction plate the center line of which is aligned with the trackway on which the wheel is directed. The axes of each set of rollers converge inwardly in a direction toward the trackway thus to provide a throat at the entrance to the trackway so that the wheel is guided onto the trackway in alignment with it.

Although the novel features which are believed to be characteristic of the invention will be pointed out in the annexed claims, the invention itself as to its objects and advantages and the manner in which it may be carried out may be better understood by reference to the following description taken in connection with the accompanying drawings forming a part hereof, in which:

Fig. 1 is a plan view of a wheel guide embodying the invention;

Fig. 2 is a view on line 2—2 of Fig. 1;

Fig. 3 is an end view of the embodiment shown in Fig. 1; and

Fig. 4 is a plan view showing one manner of mounting a pair of the wheel guides adjacent a motor vehicle ramp, such as disclosed in my said copending application S. N. 38,689, of which this is a division.

Referring now to the drawings in which like reference characters denote similar parts, the wheel guide 8 comprises a converging guide 100 for the U-shaped channel 33 and a similar converging wheel guide 101 for the companion channel 32. The channels 32 and 33 (see Fig. 4) are, as shown, trackways of a ramp 11 onto which a motor vehicle is to be driven from a direction at right angles to the channels 32 and 33. Both of the guides are alike and the one indicated at 100 will be described in connection with Figs. 1, 2 and 3.

The bed plate 102 of the guide carries an elevated flange 103 having a height substantially the same as the height of the side of its U-channel 33. Flange 104 on the opposite side is not elevated as is flange 103. These two flanges provide a wide entrance 105 and they converge to the same distance apart as the width of the U-channel 33 providing a throat to guide the wheel of a motor vehicle into the U-channel. The top of flange 103 has an elongate guard roller 106 mounted between fixed rounded sections 107 and 108 to avoid damage to the tire of the motor vehicle if it should strike these elements. On the bed plate 102 is arranged a triangular traction plate 109, the center line of which is in line with the center line of the channel 33, and also on that center line and between the plate 109 and the channel is a cylindrical traction roller 110 on which the car wheel rides. Center roller 110 has stub shafts 120 and 121 mounted to rotate in pillow blocks 122 and 123 carried on the bed plate 102; these blocks providing bearings for the stub shafts.

Between the center roller 110 and the flange 104 are arranged a plurality of other cylindrical traction rollers 111, 112 and 113 having stub shafts like roller 110 which rotate in bearings in pillow blocks 124 and 125 like the pillow blocks 122 and 123 carried on bed plate 102. A similar array of cylindrical traction rollers 114, 115, 116 is likewise arranged at the other side of traction plate 109. The rollers 111 to 116 have their axes inclined in the general direction of the path leading into the channel 33 so that a wheel riding on such rollers and approaching the center line of the channel at an angle is guided into the throat of the wheel guide into alignment with the channel 33. The rollers are so arranged as to reduce the lateral friction of the wheel away from the flanges 103 and 104 while providing traction for the wheel in the direction of roller axes leading into the channel, such traction being increased by reason of the traction plate 109 which provides traction at the entrance to the guide when the wheel is substantially in alignment with the channel. It has been found by actual test that a cylindrical roller lengthwise or substantially lengthwise of its axis has sufficient traction for the purpose.

The elevated guard roller 106 has been illustrated only on flange 103 at the right of the wheel guide 100 on the assumption that a car would approach from the left, that is, the car would be traveling in the direction of the arrow as illustrated in Fig. 4. However, a flange similar to flange 103 with a guide roller may be used in place of a flange like flange 104 if the car is to approach from the opposite direction or either direction; it being noted that in Fig. 4 the flange 103a corresponding to flange 103 is on the left side of the guide 101 whereas flange 103 is on the right.

As indicated, the wheel guides are advantageously used in pairs as illustrated in Fig. 4, one guide being provided for each of channels 32 and 33, and while the use of the guide has been described for illustrative purposes, as being connected to a ramp, it will be understood that wheel guides embodying the invention may be utilized advantageously in other places where it is desired to drive a car under its own power from a roadway or aisle into alignment with a confined trackway or stall at an angle from the roadway.

From the foregoing description it will be noted that when a car is being driven under its own power in a direction shown by the arrow 126 in Fig. 4 and it is desired to turn the car to the left to drive it onto the channels 32 and 33 of the ramp 11, the car is steered so that the left front wheel enters the wide mouth of guide 100 and the right front wheel enters the guide 101. By reason of the rollers, the axes of which extend in the same general direction as the channels, the wheels are guided into the throats of the guides adjacent the channels so that the wheels enter the channels in alignment with them. Likewise when the rear wheels enter the wheel guides the rollers likewise guide them in alignment with the channels. Although the rollers provide traction for the wheels in the direction of the roller axes, the traction plates 109 provide increased traction for forward movement of the wheels into channels 32 and 33 when they are in substantial alignment with the channels.

The terms and expressions which have been employed herein are used as terms of description and not of limitation, and there is no intention in the use of such terms and expressions of excluding any equivalent of the features shown and described or portions thereof, but it is recognized that various modifications are possible within the scope of invention claimed.

What is claimed is:

1. A guide for guiding the wheels of a motor vehicle driven under its own power which comprises a bed plate, a substantially horizontal traction surface on said bed plate, a set of traction rollers on each side of said traction surface on which the wheels of the vehicle may ride, each set of traction rollers converging in a direction toward the rear of said traction surface, and a guard member above the surface of said traction rollers and extending in the same direction as the axes of one set of said traction rollers.

2. A wheel guide for guiding the wheels of a motor vehicle when said vehicle is driven under its own power and steered from a given direction of travel to move it in a direction at an angle to said given direction which comprises a bed plate, a traction surface on said bed plate of generally triangular shape having its center line extending in a direction toward the rear of said bed plate, a first set of traction rollers on said bed plate mounted for rotation on one side of said center line and a second set of traction rollers on said bed plate mounted for rotation on the other side of said center line, the axes of rotation of said first and second sets of traction rollers converging in a direction toward the rear of said bed plate, and a guard member above the traction rollers and extending along one set of rollers outside their traction area and adapted to engage the side walls of the tires of the motor vehicle wheels.

3. A wheel guide for guiding the wheels of a motor vehicle when said vehicle is driven under its own power and steered from a given direction of travel to move it in a direction at an angle to said given direction which comprises a bed plate, a traction plate of generally triangular shape mounted on said bed plate with its center line extending in a direction toward the rear of said bed plate, a traction roller between the rear end of said bed plate and said traction plate and having its axis of rotation in alignment with the center line of said traction plate, a first set of traction rollers mounted on said bed plate on one side of said traction plate, a second set of traction rollers mounted on said bed plate on the other side of said traction plate, said two sets of traction rollers having their axes of rotation converging in a direction toward the rear of said bed plate.

4. A guide for guiding the wheels of a motor vehicle which comprises a bed plate, a traction plate of generally triangular shape mounted on said bed plate with its center line extending toward the rear of said bed plate, a rotatable elongate center traction roller between said traction plate and the rear of said bed plate, pillow blocks on said bed plate mounting said center roller for rotation about an axis in alignment with the center line of said traction plate, a first set of rotatable elongate traction rollers on one side of said traction plate, pillow blocks on said bed plate mounting said first set of rollers for rotation, the axes of rotation of said first set of rollers converging toward said center line in a direction toward the rear of said bed plate, a second set of rotatable elongate traction rollers on the other side of said traction plate, and pillow blocks on said bed plate mounting said second set of rollers for rotation, the axes of rotation of said second set of rollers converging toward said center line in a direction toward the rear of said bed plate.

5. A guide for guiding the wheels of a motor vehicle which comprises a bed plate, a traction plate of generally triangular shape mounted on said bed plate with its center line extending toward the rear of said bed plate, a rotatable elongate center traction roller between said traction plate and the rear of said bed plate, pillow blocks on said bed plate mounting said center roller for rotation about an axis in alignment with the center line of said traction plate, a first set of rotatable elongate traction rollers on one side of said traction plate, pillow blocks on said bed plate mounting said first set of rollers for rotation, the axes of rotation of said first set of rollers converging toward said center line in a direction toward the rear of said bed plate, a second set of rotatable elongate traction rollers on the other side of said traction plate, pillow blocks on said bed plate mounting said second set of rollers for rotation, the axes of rotation of said second set of rollers converging toward said center line in a direction toward the rear of said bed plate, and a rotatable guard roller above and on the outside of said traction rollers and mounted for rotation on said bed plate about an axis substantially parallel with the axes of rotation of said first set of traction rollers.

6. A mechanism for guiding the wheels of a motor vehicle into a pair of channels forming a trackway for the vehicle, which mechanism comprises a separate wheel guide for each of said channels, each wheel guide comprising a bed plate, a horizontally disposed traction plate of generally triangular shape on said bed plate, having a center line extending toward the rear of said bed plate, a center traction roller mounted between said traction plate and the rear of said bed plate and having its axis in alignment with said center line, a set of elongate traction rollers mounted on said bed plate on each side of said traction plate, the axes of rotation of each set of traction rollers converging toward said center line in the direction toward the rear of said bed plate, a guard roller mounted on said bed plate for rotation above and outside the area of said traction rollers and having its axis of rotation substantially parallel with the axes of rotation of one of said sets of traction rollers, the center line of one of said pair of guides aligning with the center line of one of said pair of channels and the center line of the other of said guides aligning with the center line of the other of said channels.

ELLIS E. WHITE.

REFERENCES CITED

The following references are of record in the file of this patent:

UNITED STATES PATENTS

| Number | Name | Date |
| --- | --- | --- |
| 1,551,556 | Gust | Sept. 1, 1925 |
| 2,085,329 | Porte | June 29, 1927 |